3,109,846
COLORED REACTION PRODUCTS PRODUCED BY REACTION OF SULFATO BETAINES WITH ALKALI
Donald L. Klass, Barrington, and Vincent Brozowski, Mundelein, Ill., assignors to The Pure Oil Company, Chicago, Ill., a corporation of Ohio
No Drawing. Filed Dec. 23, 1960, Ser. No. 77,852
7 Claims. (Cl. 260—294.8)

This invention relates to certain novel organic compounds derived from tertiary amine-sulfato betaines and to methods of preparation of said compounds. More particularly this invention is concerned with the production of a new class of compounds, characterized by their strong colors, prepared by reaction of tertiary amine-sulfato betaines with alkali hydroxides.

In our copending patent application Serial No. 46,362, filed August 1, 1960, entitled Process and Product, we have disclosed the preparation of certain novel organic compounds having a betaine structure (also known as inner salts or zwitter-ions), by reaction of an organic epoxide with a sulfur trioxide-tertiary amine complex. The epoxides therein disclosed are all oxiranes containing from 2 to 60 carbon atoms in the molecule. This invention is concerned with the preparation of certain novel (and high colored) derivatives of said compounds.

One of the objects of this invention is the preparation of novel derivatives of tertiary amine-sulfato betaines.

Another object of this invention is the preparation of novel, high-colored, organic compounds from pyridine-sulfato betaines.

A feature of this invention is the provision of a novel reaction product produced by reaction of a tertiary amine-sulfato betaine with an alkali hydroxide.

Another feature of this invention is the provision of a novel class of reaction products which are highly colored and suitable for use as dyes, produced by reaction of a pyridine-sulfato betaine with an alkali hydroxide.

Another feature of this invention is the provision of an improved process for the preparation of colored organic compounds by reaction of an alkali hydroxide with a tertiary amine-sulfato betaine.

Other objects and features of this invention will become apparent from time to time throughout the specification and claims as hereinafter related.

In our aforementioned copending patent application, we have reported our discovery of a novel class of organic compounds viz., betaines or inner salts of the formula,

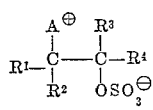

where $R^1$, $R^2$, $R^3$, and $R^4$ are selected from the group consisting of hydrogen, hydrocarbon, and substituted hydrocarbon radicals, and $A^\oplus$ is a tertiary amine. These compounds are prepared by reaction of an organic epoxide with a sulfur trioxide-tertiary amine complex; by reaction of a cyclic sulfate ester with a tertiary amine; or by sequential treatment of an epoxide with a sulfonating agent, such as dioxane-sulfur trioxide complex, followed by treatment with a tertiary amine. We have now found that when these inner salts or betaines are reacted with aqueous base (an aqueous solution of any alkali metal or alkaline earth metal oxide or hydroxide), a reaction product or derivative is formed which is highly colored, thermally and chemically stable, and appears to be a salt or polymer of the unit,

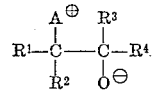

where $A^\oplus$, $R^1$, $R^2$, $R^3$, and $R^4$ are as previously defined. In this reaction sulfur is lost from the reactant betaine compound and the product appears to be a sulfur-free betaine which is highly colored and suitable for use as a dye or pigment. The compounds which are produced in this manner are high-melting, crystalline solids which are soluble in alcohol to yield a highly colored solution which is capable of permanently coloring cloth and paper. In carrying out this invention we can use any of the betaine compounds of the class described in our copending application for reaction with any alkali hydroxide to yield sulfur-free derivatives.

The following non-limiting examples are illustrative of the scope of this invention.

*Example 1*

A 5.0-gram portion of 1-pyridinium-2-sulfato-3-chloropropane,

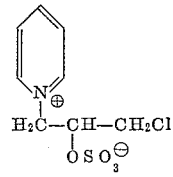

was dissolved in 40 ml. of boiling water and treated with a solution of 5.0 g. of sodium hydroxide in 10 ml. of water. A brown precipitate formed immediately. The reaction mixture was warmed on a steam bath for one hour, cooled to room temperature and filtered. The product was washed with water and ether, and then air-dried. There was obtained a yield of 2.5 g. of a brown crystalline solid.

The product was found to be insoluble in hot 20% hydrochloric acid solution, hot 15% sodium hydroxide solution, boiling water, ether, toluene, and acetone. It was sparingly soluble in boiling alcohol and produced a brown solution which permanently dyed pieces of cloth and paper upon immersion therein. Contact with concentrated sulfuric acid caused the solid to change in color from brown to purple. The melting point of the product was greater than 300° C. (limit of the apparatus used), thus indicating a betaine structure for the product. Elemental analysis of the product was carbon, 65.0%; hydrogen, 6.7%; nitrogen, 5.5%; sulfur, less than 0.05%; chlorine, less than 0.5%. The physical properties of this product, together with the elemental analysis, would indicate that the product is probably a betaine salt or polymer having the structure,

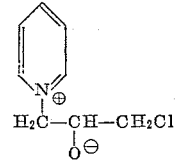

Example II

In another experiment the procedure of Example I was followed for the reaction of 1-pyridinium-2-sulfato propane,

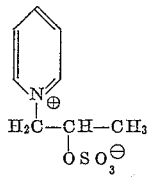

with aqueous sodium hydroxide. In this experiment, a black crystalline product was obtained which melted, with decomposition, at about 193–205° C. The product which was obtained was more soluble than the product of Example I, being slightly soluble in ether, chloroform, and cold alcohol. Solutions of the product in chloroform were deep red in color and were suitable for use as dyes. The elemental analysis for this product was: carbon, 68.4%; hydrogen, 6.8%; nitrogen, 9.7%; sulfur, 0.61%. The physical properties and elemental analysis of this product indicate that it is probably a betaine of the structure,

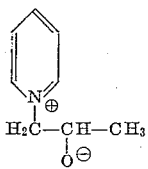

Example III

In still another experiment, following the procedure of Examples I and II, 1-pyridinium-2-sulfato-ethane,

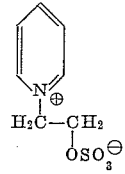

was reacted with aqueous alkali to yield a solid crystalline product. The reaction product was a brown crystalline material having a high decomposition temperature (of 200° C.). This product was only slightly soluble in the solvents tested in Examples I and II. This product is useful as a pigment for paints and coating resins.

Example IV

When 1-pyridinium-2-sulfato-dodecane,

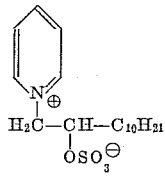

is reacted with aqueous potassium hydroxide, a colored crystalline precipitate is obtained. This product is apparently a betaine of the structure,

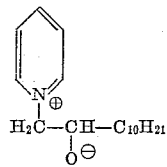

Example V

When 1-pyridinium-2-sulfato-2-phenylethane,

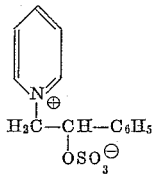

is reacted with aqueous magnesium hydroxide a colored crytalline precipitate is obtained.

This product is apparently a betaine of the structure,

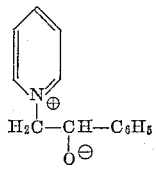

When any of the tertiary amine-sulfato betaines of our aforementioned copending patent application are reacted with alkali hydroxides, sulfur-free (less than about 1.0% sulfur) reaction products are obtained which are high-melting, crystalline betaine derivatives. As in our copending patent application, the tertiary amine portion of the betaine molecule may be any tertiary amine, such as trimethylamine (or other trialkylamines), dimethylaniline, quinoline, acridine, and derivatives thereof containing only inert substituents. The remainder of the betaine structure may be derived from any hydrocarbon epoxide (which may contain other inert substituents). The alkali hydroxide which is reacted with the betaine compounds to produce the novel reaction products of this invention, may be any of the hydroxides of the alkali metals and alkaline earth metals.

The embodiments of the invention in which an exclusive property or privilege is claimed are defined as follows:

1. A process for preparing organic nitrogen compounds comprising reacting an aqueous alkali hydroxide solution with a betaine of the formula

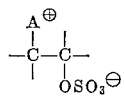

in which $A^\oplus$ is a tertiary amine having only hydrocarbon groups connected to the nitrogen atom and

is the residue of an oxirane having 2 to 60 carbon atoms.

2. A process in accordance with claim 1 in which $A^\oplus$ is pyridine.

3. A process in accordance with claim 2 in which the aqueous alkali hydroxide solution is sodium hydroxide solution.

4. A process in accordance with claim 3 in which the oxirane is epichlorhydrin.

5. A process in accordance with claim 3 in which the oxirane is propylene oxide.

6. A process in accordance with claim 3 in which the oxirane is decyl oxirane.

7. A process in accordance with claim 3 in which the oxirane is phenyl oxirane.

No references cited.